United States Patent
Wadsworth

[11] Patent Number: 5,830,052
[45] Date of Patent: Nov. 3, 1998

[54] TOTAL BONE REMOVAL SYSTEM

[76] Inventor: Ray G. Wadsworth, 40 Wadsworth Dr., Sequim, Wash. 98382

[21] Appl. No.: 867,852

[22] Filed: Jun. 3, 1997

Related U.S. Application Data

[60] Provisional application No. 60/025,346, Sep. 3, 1996.
[51] Int. Cl.$^6$ .................................................. A22C 25/16
[52] U.S. Cl. ............................................ 452/161; 452/136
[58] Field of Search .................................. 452/161, 162, 452/135, 136

[56] References Cited

U.S. PATENT DOCUMENTS

| | | | |
|---|---|---|---|
| 1,754,157 | 4/1930 | Gallison | 452/161 |
| 2,210,955 | 8/1940 | Rieske | 452/161 |
| 3,596,308 | 8/1971 | Kenney | 452/161 |
| 4,037,294 | 7/1977 | Cowie et al. | |
| 4,365,387 | 12/1982 | Hartmann et al. | 452/161 |
| 4,484,375 | 11/1984 | Brower | 452/162 |
| 4,602,404 | 7/1986 | Betnar | |
| 4,945,607 | 8/1990 | Akesson et al. | |
| 4,985,965 | 1/1991 | Leavitt | |
| 5,106,335 | 4/1992 | Behnk et al. | 452/162 |
| 5,462,478 | 10/1995 | Fredsby et al. | |
| 5,520,576 | 5/1996 | Wastell et al. | |
| 5,536,205 | 7/1996 | Braeger et al. | |

FOREIGN PATENT DOCUMENTS

| | | | |
|---|---|---|---|
| 14871 | 10/1934 | Australia | 452/161 |
| 630470 | 5/1936 | Germany | 452/161 |
| 2833097 | 3/1979 | Germany | 452/161 |
| 224207 | 7/1985 | Germany | 452/161 |
| 40-5304879 | 11/1993 | Japan | 452/161 |

*Primary Examiner*—Willis Little
*Attorney, Agent, or Firm*—James Creighton Wray; Meera P. Narasimhan

[57] ABSTRACT

A total bone removal system is disclosed wherein the apparatus and method for a bone removal and filleting process for decapitated fish, including removal of pin bones, is described. The apparatus has a jig and vacuum supports for securing a fish, and a traversable blade assembly for cutting the fish.

17 Claims, 11 Drawing Sheets

TOTAL BONE REMOVAL SYSTEM

BACKGROUND OF THE INVENTION

This application claims the benefit of U.S. Provisional application Ser. No. 60/025,346, filed Sep. 3, 1996.

The present invention relates to methods and apparatus for removing bones from fish.

Salmon and trout are important segments of world food production and nutrition. A major problem in the marketability of salmon and trout is the presence of pin bones. Conventional processing machines include spinning knife blades electronically or mechanically positioned to conform to varying fish shapes. Currently, pin bones are removed from fish using labor intensive and time consuming techniques, including hand picking with pliers or hand held pluckers, hand "V" cutting pin bones from pre-filleted fish, hand "J" cutting portions of fillets, and full length segment slicing. Highest recoveries are achieved by picking bones manually or with the aid of hand-operated implements or machines. "V" cuts, "J" cuts and segment cuts provide for expedited bone removal but result in poor recoveries. Existing methods are extremely labor intensive, time consuming and impractical in view of North American labor costs. In addition, current processing methods require multiple steps to arrive at final products, resulting in wasted time, money and effort. Needs exist for methods and apparatus for quickly and efficiently removing all bones from fish prior to packaging, storage and delivery.

Alaska alone produced over two hundred million wild and hatchery salmon in 1995, a number that correlates to about one billion pounds of fish annually. The majority of that product was decapitated and gutted for freezing or canning. Approximately 25% of the weight of the round fish, or 250 million pounds, is bone and fins, which are ultimately discarded by the end user. Even canned salmon bones that are edible are picked out and discarded by modern consumers. To ship 250 million pounds of bones and fins uses about 5 million 50# boxes, resulting in a fiber cost of about $5 million, a freight cost of about $25 million and an energy and personnel cost of about $50 million ($0.2 per pound). Those freezing and boxing costs, however, are only the initial costs. Alaskan products, like all other salmon, are reprocessed before being presented to the end user. That requires thawing, filleting and, in the case of value added processes, repackaging and refreezing. Added costs for those steps easily reach $50 million. In short, Alaskan producers spent about $80 million in 1995 alone in fiber, freight and processing simply because total bone removal at initial stages was not feasible. Needs exist for machines that provide for total bone removal with high flesh recovery prior to any packaging or transport.

For safety and personal reasons, consumers demand that fish be completely deboned prior to purchase and consumption. Needs exist for deboning methods and apparatus that remove all bones without labor intensive or cost prohibiting procedures.

SUMMARY OF THE INVENTION

The present invention provides for total bone removal in a single processing step using novel cutting techniques and apparatus.

The present invention is a total bone removal system that enhances the value of salmon and trout in worldwide markets. The system makes fish ready for consumption, without danger of swallowing bones or the inconvenience of manually removing pin bones. The present system greatly benefits the fishing industry, especially the Alaskan wild salmon industry, by enabling primary processors to yield a more consumer ready product in one processing stage while reducing fiber, initial freezer time, cold storage, freight, and handling energy costs.

The present system efficiently removes all bones from a decapitated fish. The decapitated carcass is secured on a jig which supports the spine from inside the gut cavity and the kidney. Vacuum supports fasten to both sides of the fish. Pairs of blades having special shapes and functions are inserted through the flesh from the removed head. Circular blades travel along the upper vertical bones while pin bone blades travel immediately above and below the pin bone array. Rotary cutters sever the ligaments at the outer skin end of the pin bones. At the appropriate time other blades are inserted to cut from the aft end of the pin bones to the tail. Lower blades, which include sections that are hinged and curved, remain on the outside of the rib cage and follow the back bone to and beyond the tail. Upon complete insertion, the vacuum supports are pivoted outward. The belly flap of the fish remains intact as the fillets spread apart. All bones, including the pin bones and the rib bones which surround the gut cavity, are separated from the fillets and remain on the jig. The roe remains, undisturbed, inside the rib cage.

ADVANTAGES RECOGNIZED BY THE PRESENT TOTAL BONE REMOVAL SYSTEM

The present system provides for a one-step bone removal and filleting process.

The roe is not damaged during the bone removal process.

The present system requires only a small crew for efficient operation and is ideal for small floating processors to provide frozen-at-sea products.

The present system leaves the belly flap intact, which permits the fillets to be folded back together to accommodate conventional freezing equipment and to protect the cut flesh from freezer burn.

Because bones and fins are removed, substantially more product can be frozen in a given freezer cycle.

Because all bones and fins are removed, the products can be direct marketed to the retailer in a consumer friendly, ready to prepare condition.

Recovery from round uncut fish, to "all bones removed" is 55% to 60%.

Preferably the present system includes an alignment jig and securing device, vacuum supports, a pelvic bone and fin removal system, circular blades and a blade assembly. The blade assembly includes pin bone blades, rotary cutters, drop blades and rib bone blades. The alignment jig is a cantilevered apparatus with extensions and a fastening screw. The vacuum supports are plastic or silicone cups which attach to the fish by vacuum. The pelvic bone and fin removal system incorporates a hole saw shaped blade or a jawed, bear trap, type implement. The circular blades rotate in a single linear plane, one on either side of the dorsal fin bone array. The pin bone blades have sharp points and gradual slopes with a router type cutter located at the outboard tip of the pin bone location. The drop blades are sword shaped knives that insert from the top of the fish and move through the lower skin in a slicing movement. The rib bone blades are sloped and hinged to pass along the outboard sides of the rib cage of the fish. The rib blade sections are guided and toe in toward the center of the fish, without cutting the bone. A Moving carriage supports the assembly or jig. The carriage travels along multiple rods for inserting the blades into the fish or the fish onto the blades. The jig and carriage are aligned to deliver the blades to exact locations on the fish.

To operate the system, a beheaded fish is slid on the alignment jig. Once the fish is securely mounted and aligned, the carriage is activated, advancing the blades toward the fish or the fish toward the blade. Just prior to the blades entering the fish, the vacuum supports are engaged. The vacuum supports help support the fish and lift the fillets away from the skeleton as the cut is being made. The pelvic fin removal device is actuated, cleanly cutting away the fin and bone structure. The circular blades travel through the flesh and the skin on both sides of the dorsal fin and upper vertical bone array. The pin bone blades follow the back bone, cutting above and below next to the pin bones, but not penetrating the skin. The rotary pin bone cutters follow along the outer tip of the pin bone arrays, just under the skin, cutting the outer ligaments that attach the pin bones to the flesh and skin. The drop blades are inserted just to the rear of the pin bone arrays, passing vertically next to the backbone until the blades protrude through the lower skin, near the anal opening. The drop blades continue in that orientation until they pass out of the tail of the fish. The rib bone blades follow along and contour around the rib bones. The hinged twist blades are actuated by guides that cause the lower curved blades to silhouette the diminishing profile of the gut cavity as surrounded by the rib bones. When the cutter carriage completes its traversal, the vacuum supports move apart, pulling the fillets away from the backbone, pin bone arrays and rib cage. The fillets remain attached along the belly flap. The backbone and pin bone arrays, along with fins and entrails are removed from the jig. The fillets are folded back together or may be cut along the belly into two fillets for packaging.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
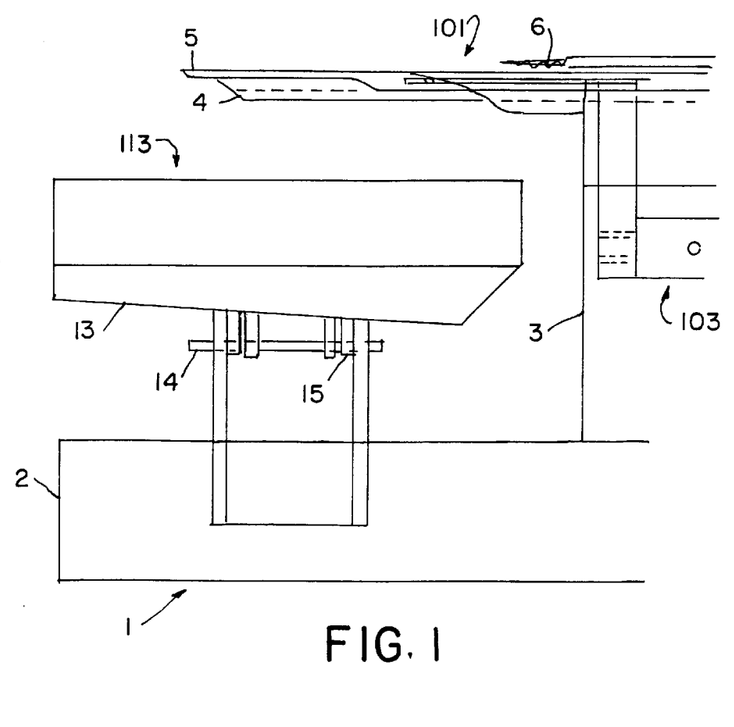
FIGS. 1–3 are side, end and top views of the cantilevered skeletal alignment jig, spine securing screw, blade guides and vacuum supports.
Figure 2:
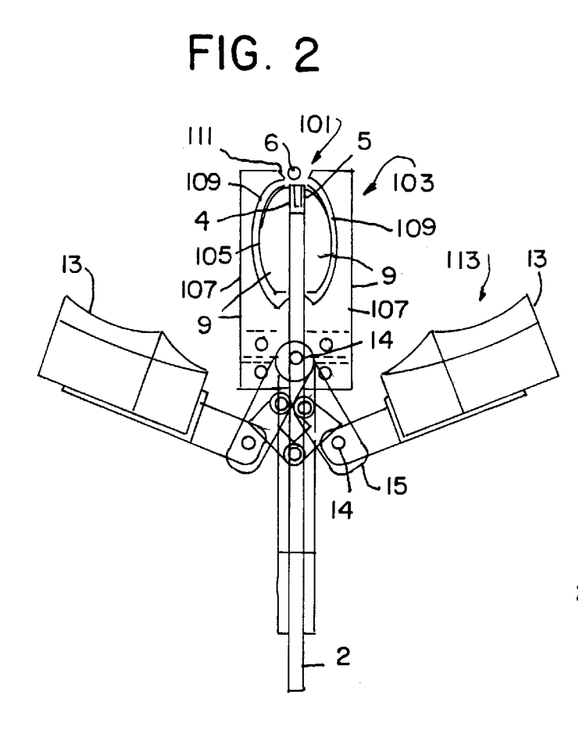
Figure 3:
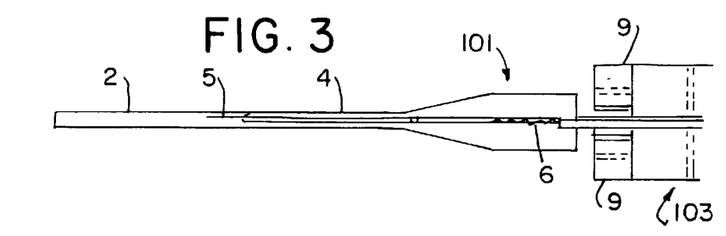

As shown in the drawings, the present invention is a compact system for filleting and deboning fish in a single station. As shown in FIGS. 1–3 the system 1 includes a jig structure 101 and a blade guide assembly 103. The jig structure preferably includes a base 2, a generally vertical member 3 extending from an upper surface of the base and a cantilevered spine support 4 extending in a generally horizontal direction from the vertical member 3. Preferably the spine support 4 is a four sided structure with a slot to hold a spine support extension pin 5. The spine support 4 has a length and width such that the back bone of a fish may rest securely on the spine support 4. A spine screw 6, which preferably has a sharp point, threads into the spine of a fish and holds the backbone of the fish on the spine support 4. The spine support extension pin 5 is driven along the underside of the spine, from the end of the gut cavity, toward the tail, in between the bones in the lower vertical bone array, thus supporting the tail. Any other acceptable means may be used for securing the backbone.

A rib blade guide assembly 103 is mounted on the vertical support member 3. The assembly 103 includes a pair of hinged rib blade guides 9 connected to vertical support member 3. Inner guides 105 and outer guides 107 have curved spaces 109 through which and by which rib blades are guided. Sloping upper surfaces 111 are positioned beneath pin bone blades.

A fish body stabilizer 113 also has a pair of vacuum supports 13 connected to the base 2. The vacuum supports 13 are preferably hinged on pins 14 in lugs 15 connected to the base 2. In one preferred embodiment the vacuum supports are made from foam. In an other preferred embodiment the vacuum supports are silicone cups. The supports are contoured and shaped to fit on both sides of the fish while it rests on the spine support 4. The vacuum supports 13 are supported by a fixture that swings the pads or cups up and together to grasp a fish. Preferably vacuum hoses are attached to the pads or cups and internally ported to allow the pads or cups to draw fast to the fish.

Figure 4:
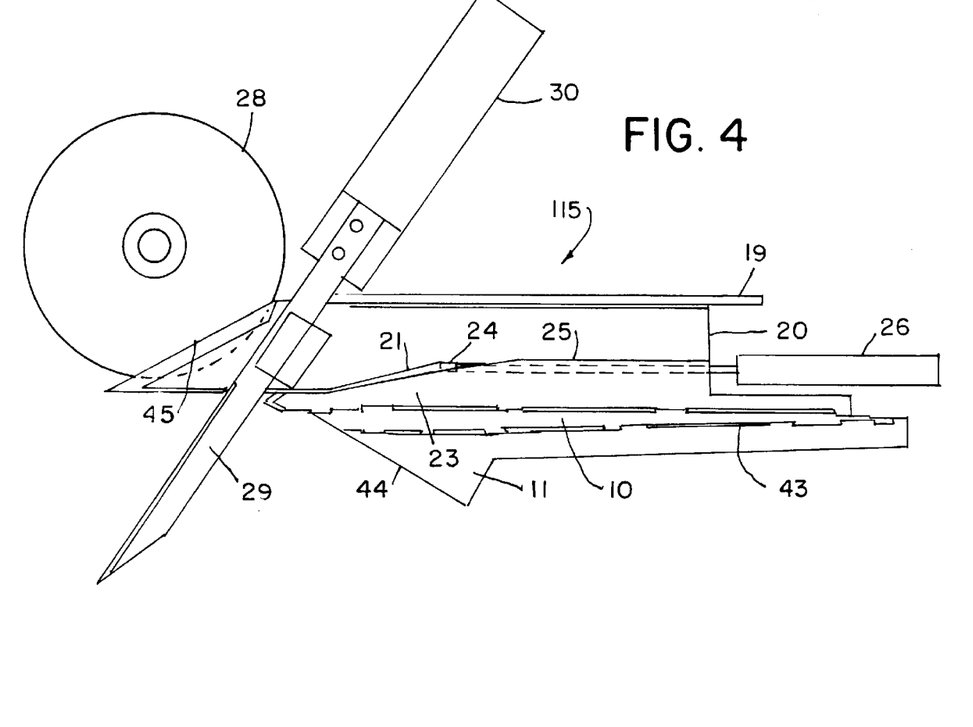
FIGS. 4–6 show side, end and top views of the blade assembly.
Figure 5:
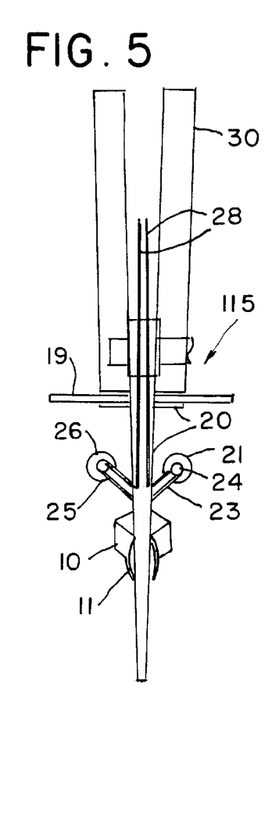
Figure 6:
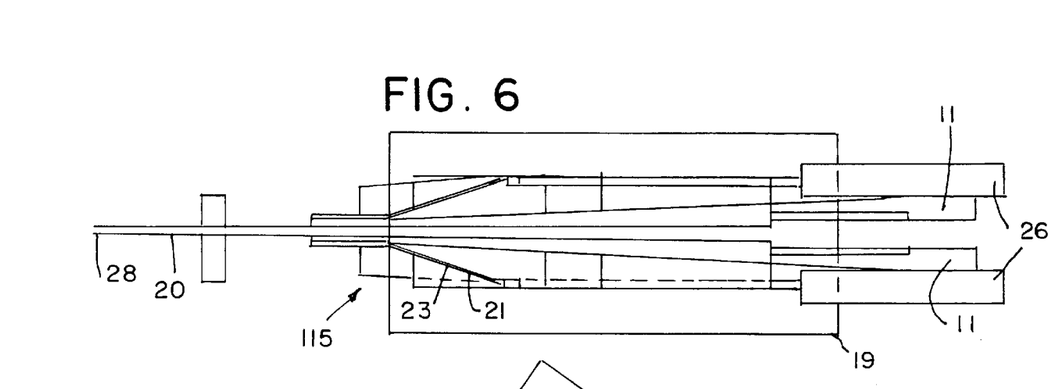

FIGS. 4–6 show the blade assembly 115. The blade assembly embodies a mounting plate 19 which is preferably horizontal. A fillet cutter body 20 is attached to the mounting plate 19. The fillet cutter body 20 incorporates upper pin bone blades 21, lower pin bone blades 23, and rotary pin bone cutters 24. The rotary pin bone cutters 24 are connected to actuators 26 and rotate within shroud tubes 25, which connect the upper 21 and lower 23 pin bone blades. Upper hinged twist blades 10 and lower hinged curved blades 11, and upper hinged blades 10 lower pin bone blades 23 are connected and rendered flexible by multiple hinge joints 43. The hinges preferably resemble piano hinges connected side by side. In a relaxed state, lower hinged curved blade 11, hangs down from upper hinged twist blade 10, which hangs down from lower pin bone blade 23. The hinges allow the upper blades 10 and lower blades 11 to move and turn inside the channels 109 in the rib blade guides 9. Preferably, upper and lower hinged curved blades 10 and 11, and pin bone blades 21 and 23 have diagonal leading edges 44 shaped to permit a slicing effect. The blade sections are preferably replaceable as with all blades in the blade assembly. As the leading edges of the rib blades 10 and 11 turn inward when moving through channels 109, they accommodate the narrowing fish rib cage.

Two circular dorsal blades 28 are located, preferably, at the leading edges 45 of the fillet cutter bodies 20. Drop blades 29 are extended by drop blade actuators 30.

Figures 14, 15:
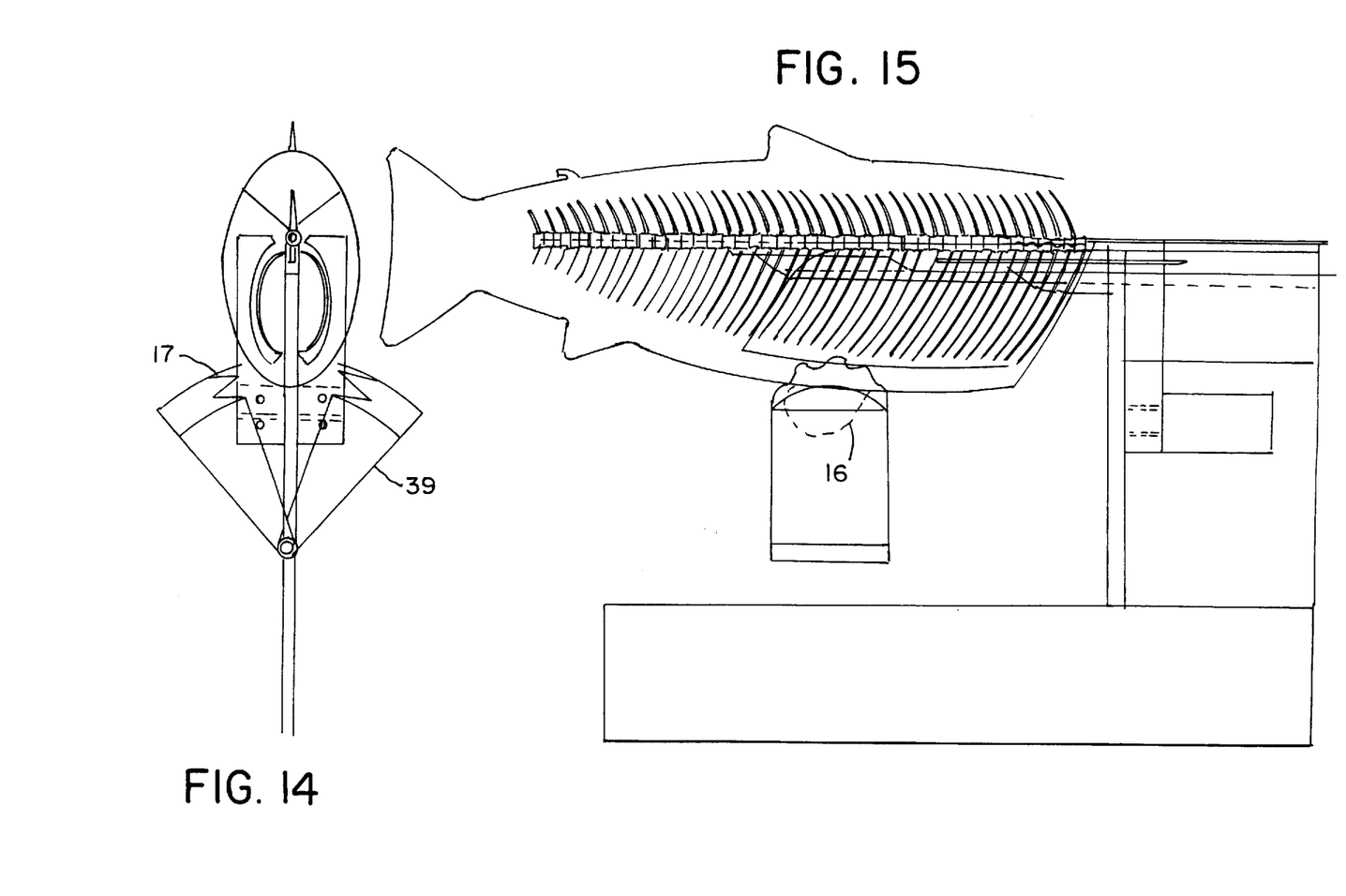
FIGS. 14 and 15 show end and side views of a pelvic bone and fin removal system.

FIGS. 14 and 15 show a pelvic bone removal device shaped like, and functioning as, pivoting arms 39 and jaws with sharp teeth 17.

Figures 16, 17:
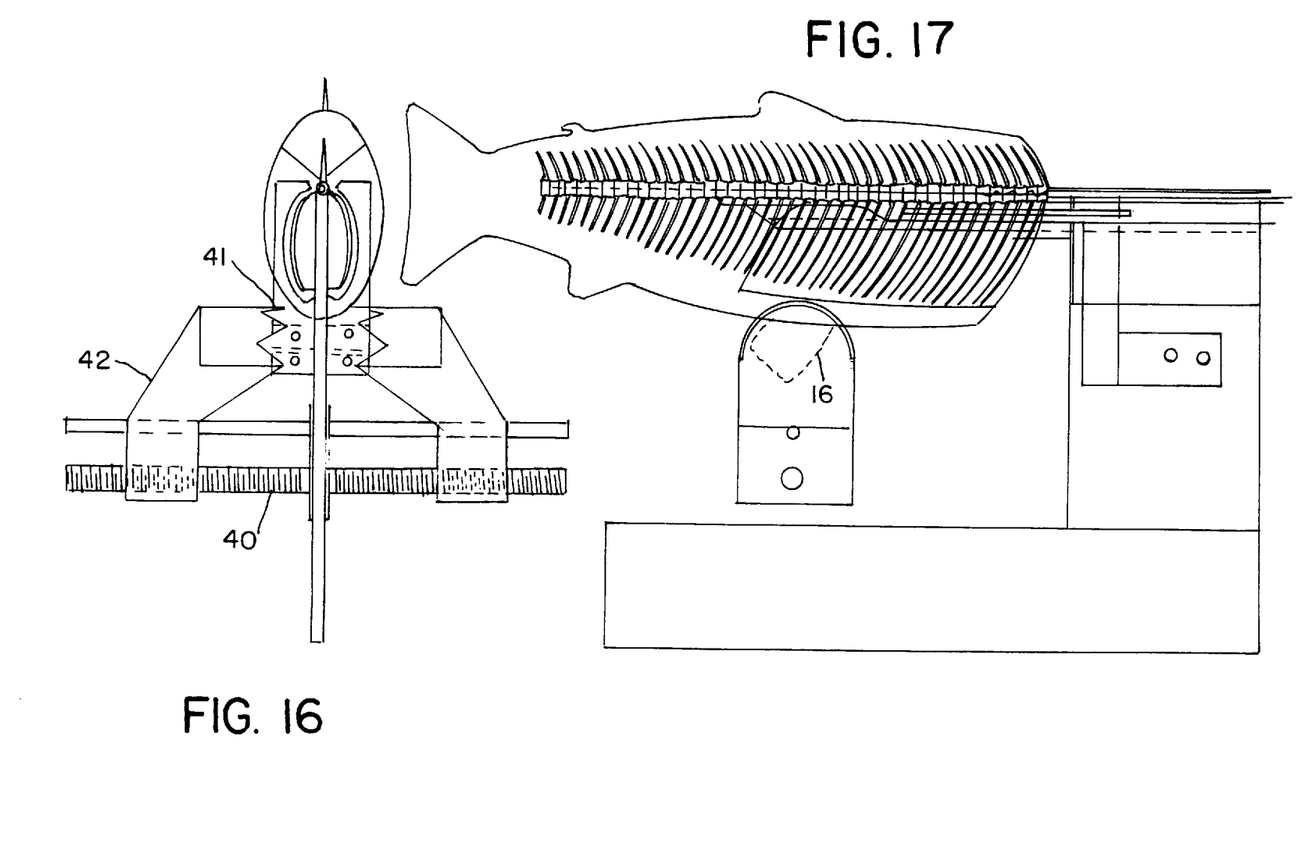
FIGS. 16 and 17 show end and side views of a jawed pelvic bone and fin removal system.

FIGS. 16 and 17 show an alternate pelvic bone and fin removal device having arms 42, moving inward by screw 40, with jaws 41 biting out the portion of flesh holding the pelvic bone and fin structure 16.

Figure 7:
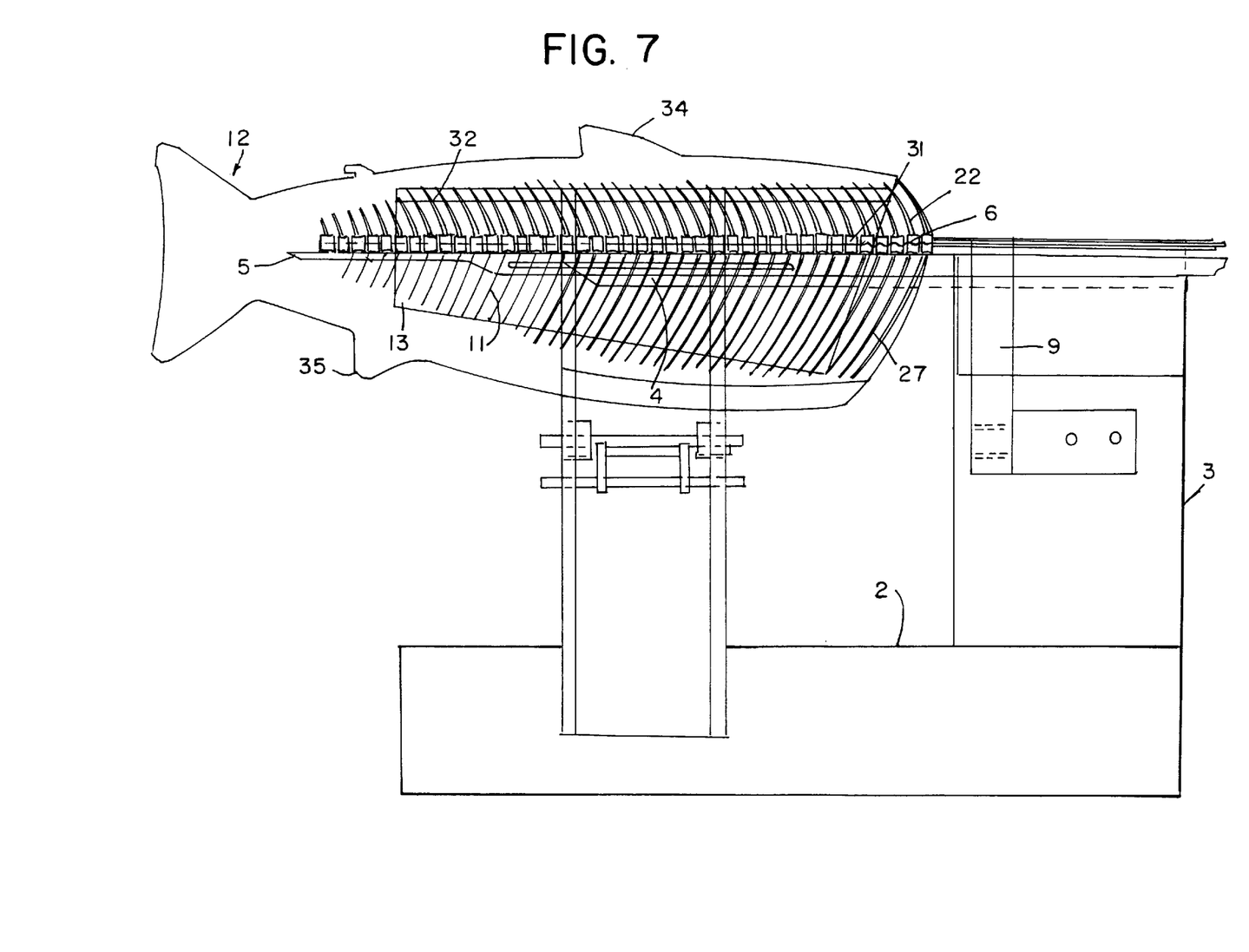
FIG. 7 is a side view of the present system having a decapitated fish with its backbone positioned and supported on the cantilevered alignment jig. The skeletal support for the tail is extended, and the vacuum supports are engaged.

FIGS. 1 through 17 detail the operation of the present system 1. A whole round salmon or other fish 12 has its head and gills removed. The removal is performed by a separate operation. As shown in FIG. 7, the decapitated fish is placed on the spine support 4 such that the spine support 4 penetrates the blood line (kidney) under the spine 31. The spine support 4 extends to the back of the kidney, or about one-half the length of the fish 12. As shown in FIG. 7, the spine 31 is fastened by the spine screw 6 positioned at the hilt of the spine support 4. As shown in FIG. 7, with the fish 12 securely fastened to the spine support 4, the spine support extension pin 5 is inserted.

Figure 9:
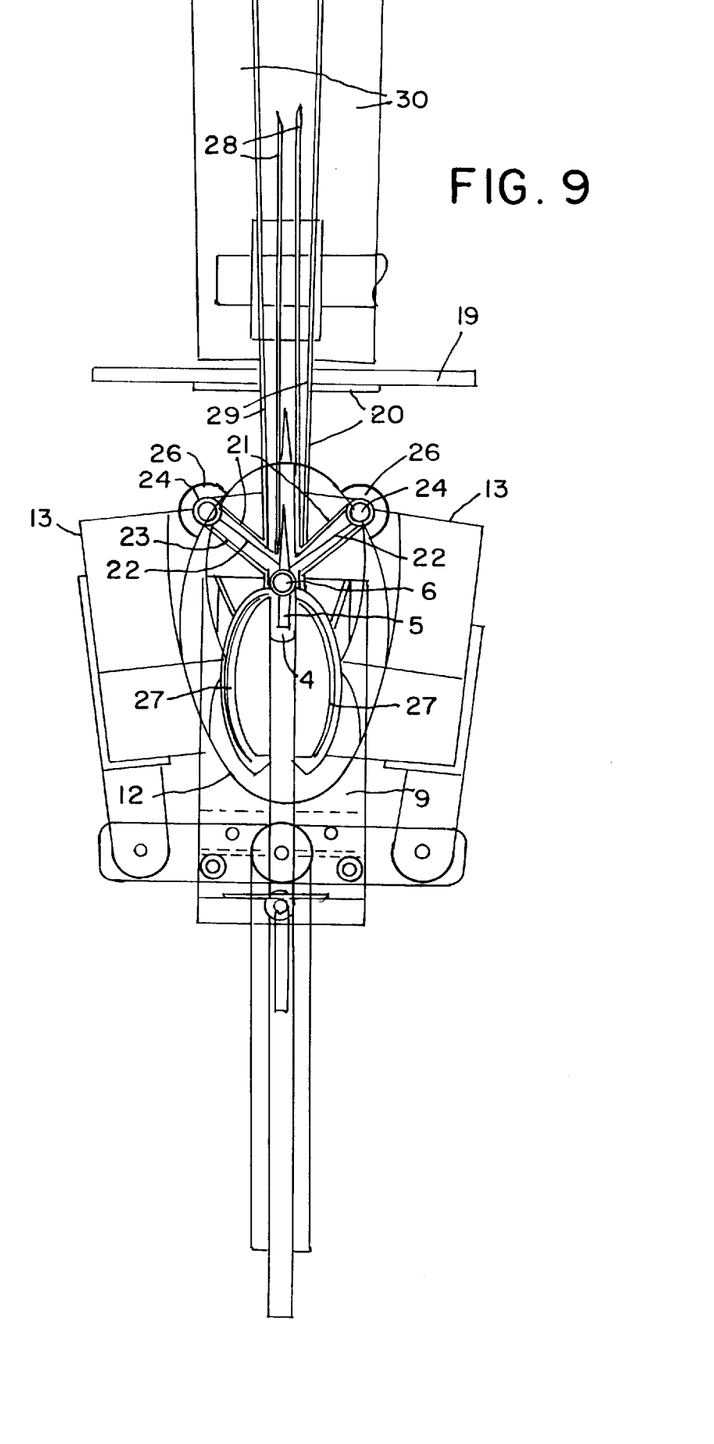
FIG. 9 is an end view of the apparatus shown in FIG. 8 with the vacuum supports closed.

Preferably, prior to any blade intrusion, the vacuum supports 13 are actuated. The vacuum supports 13 help support the fish and lift the fillets away from the skeleton as the cut is being made. As shown in FIG. 9, the vacuum supports 13 swing up, and in, attaching to the sides of the fish with suction. The vacuum supports 13 serve a dual purpose. The first purpose is to exert pressure against the sides of the fish so as to force the pin bone blade assembly to cut the depth and length of the pin bone array 22. The second purpose is to support the fillet with suction while the vacuum supports transition from closed to open as the final cut is completed.

As shown in FIGS. 14 and 15 the arms 39 of the pelvic fin removal device are actuated, cleanly cutting away the pelvic fin and bone structure 16.

Figure 8:
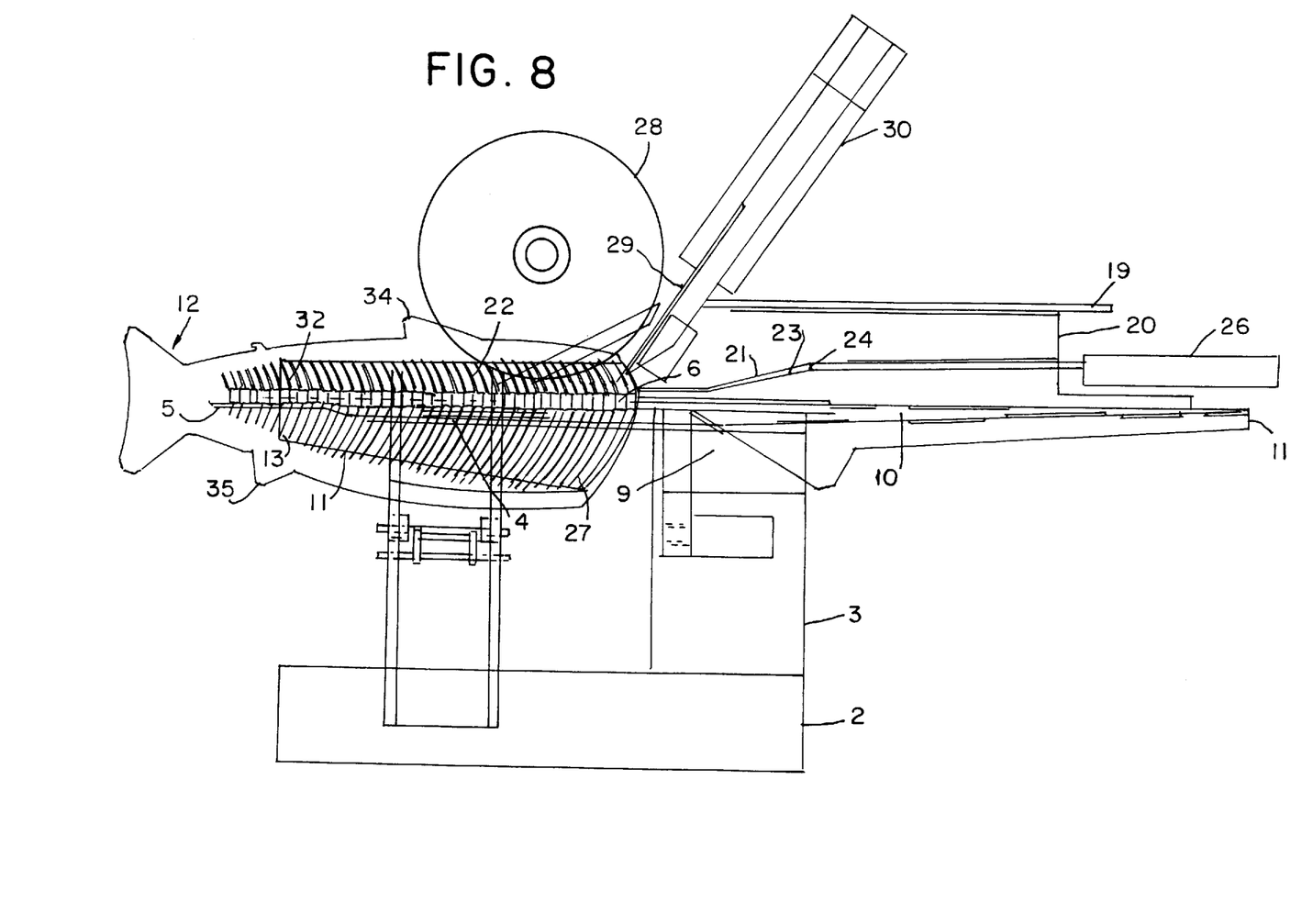
FIG. 8 shows a side view of the fish positioned on the jig. The carriage has partially travelled.

As shown in FIGS. 8 and 9, the circular blades 28 and the fillet cutter body 20 penetrate the fish 12 on either side of the dorsal fin 34. The circular blades 28 cut the skin as they pass on both sides of the dorsal fin 34 through the full length of the fish. The fillet cutter body 20 passes along either side of the dorsal fin array 34 and penetrates the entire length of the fish 12. Preferably, the fillet cutter body 20 and the circular blades 28 cut through the flesh and skin on either side of the dorsal fin 34 and top vertical bone array 32. The blades 28 and cutter body 20 follow the spine 31, for the entire length of the fish 12.

As shown in FIG. 8, the upper hinged twist blade 10 and the lower hinged curved blade 11 move into the flesh together with the pin bone blade assembly 21, 23, 24 and 25. The hinged sections of the rib bone blades 10 and 11 follow over the rib bones 27 and continue to the tail. The upper hinged twist blades 10 and the lower hinged curved blades 11 index inside the hinged rib blade guides 9. As the upper hinged twist blades 10 slide through the guides, a lever action occurs which changes the contour of the upper hinged twist blades 10, and the lower hinged curved blades 11 hinge inward. This movement follows the diminishing profile of the rib cage as the rib blades 10 and 11 move toward the tail of the fish.

The upper hinged twist blade 10 follows along the spine 31 below the pin bone array 22 on the upper portion of the rib bones 27 where they join the spine 31. The lower hinged curved blade 11 follows over the rib bones 27. Preferably, the blade sections of the upper hinged twist blade 10 and the lower hinged curved blade 11 are sharpened and positioned so as to toe in to the center of the fish without cutting the rib bones 27. That orientation, along with the actuation of the upper hinged twist blades 10 through the hinged rib blade guides 9, allows the blades to travel and conform to the rib bones 27 even as the rib bones change shape moving toward the aft end of the gut cavity.

As shown in FIG. 9, the upper pin bone blade 21 cuts on the top of, and next to the pin bone array 22 while the lower pin bone blade 23, cuts on the bottom. The rotary pin bone cutter 24 revolves at the outer tip of the pin bone blades 21 and 23 while not penetrating the skin outboard of the pin bones 22. The rotary pin bone cutter 24 severs the ligament at the outer tip of the pin bones 22, completing the separation of the pin bones and the flesh. The rotary pin bone cutter 24 severs the ligaments which attach the pin bones to the flesh at the skin end of the pin bones 22. The pin bone blade assembly 21, 23, 24 and 25 travels about half the length of the fish to where the pin bone array 22 ends just aft of the dorsal fin. The above and below pin bone blades 21 and 23 penetrate only about half the length of the fish 12 to where the pin bone array 22 ends.

Figure 10:
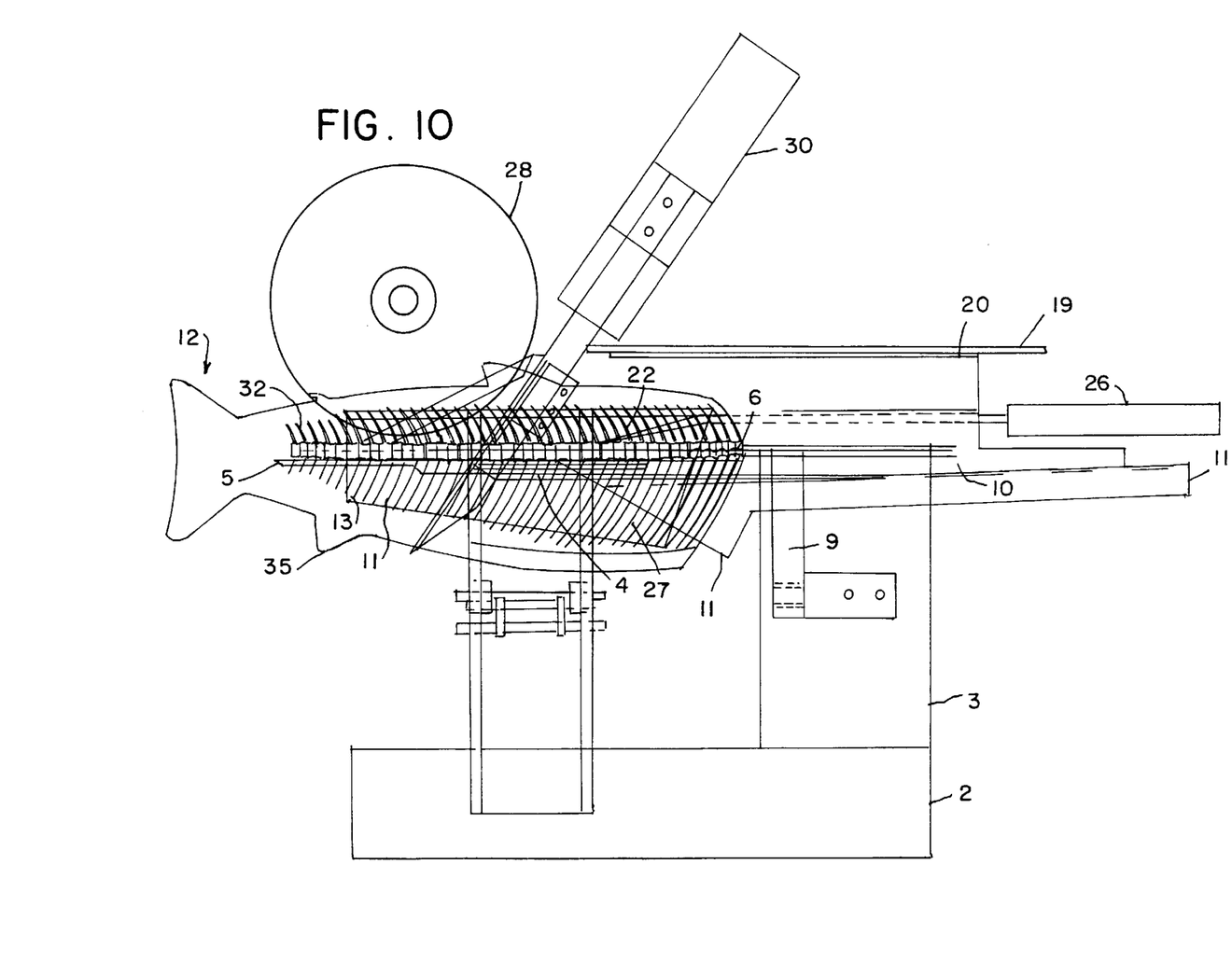
FIG. 10 shows a side view of the fish positioned on the jig. The carriage is at its mid-point of travel. The drop blades have been inserted just aft of the pin bone array and have penetrated through the lower skin surface.
Figure 11:
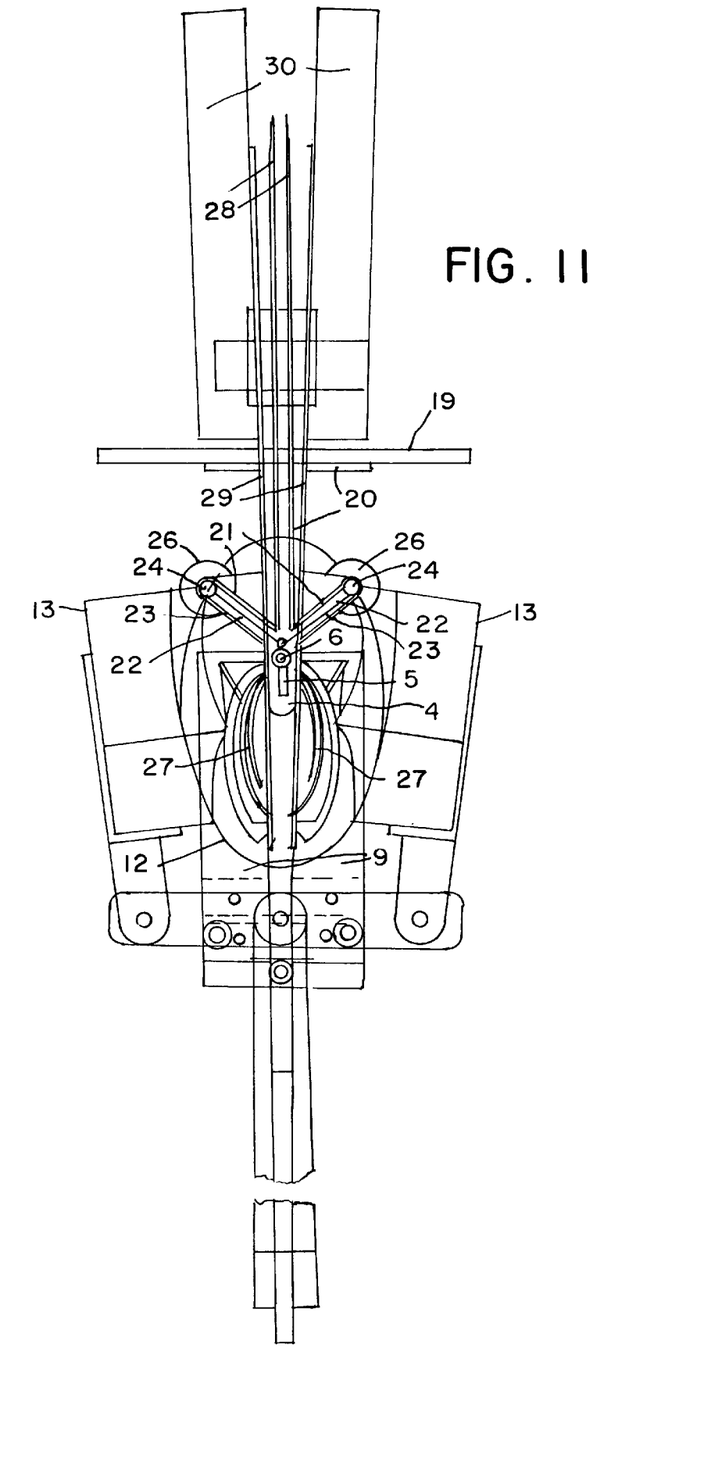
FIG. 11 is an end view of the apparatus shown in FIG. 10.
Figure 12:
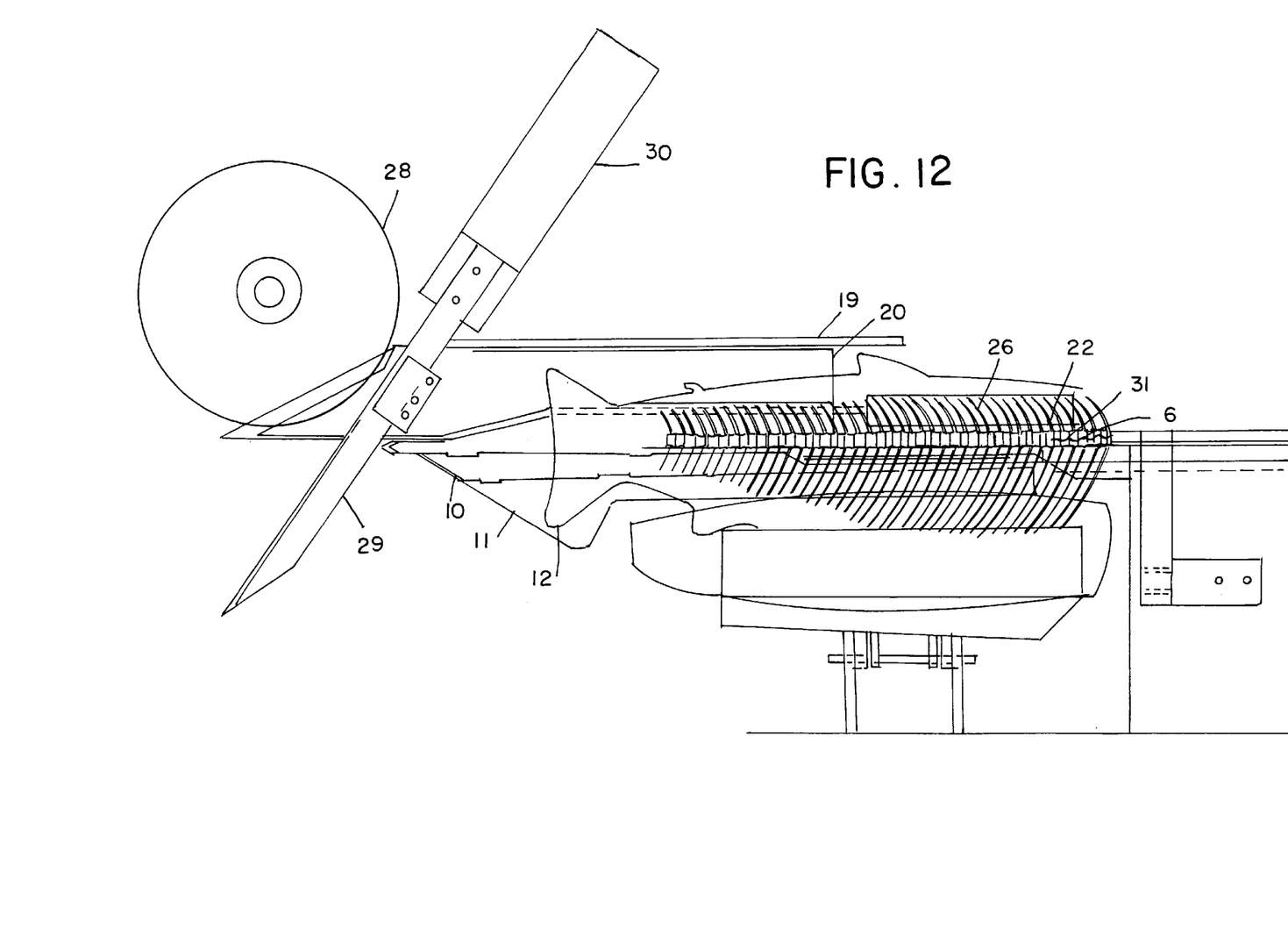
FIG. 12 shows a side view of the fish skeleton positioned on the jig. The blade assembly has completed the cut.

Preferably the drop blades 29 are extended, just aft of the pin bone arrays 22, through the fish until the drop blades penetrate the skin on the lower surface of the fish. The drop blades 29 travel through the fish in this extended position until the blades reach and pass out of the tail of the fish. During the course, the drop blades 29 separate the anal fin 35 from the flesh of the fillets. The drop blades 29 are inserted by the drop blade actuators 30. FIG. 8 shows the drop blades 29 in the retracted position. FIG. 10 shows the drop blades 29 extended in the mid position. As shown in FIG. 12, the drop blades 29 continue to extend, until they reach and pass out of the tail of the fish. During their course, the drop blades 29 separate the anal fin 35 from the flesh of the fillets 33.

Figure 13:
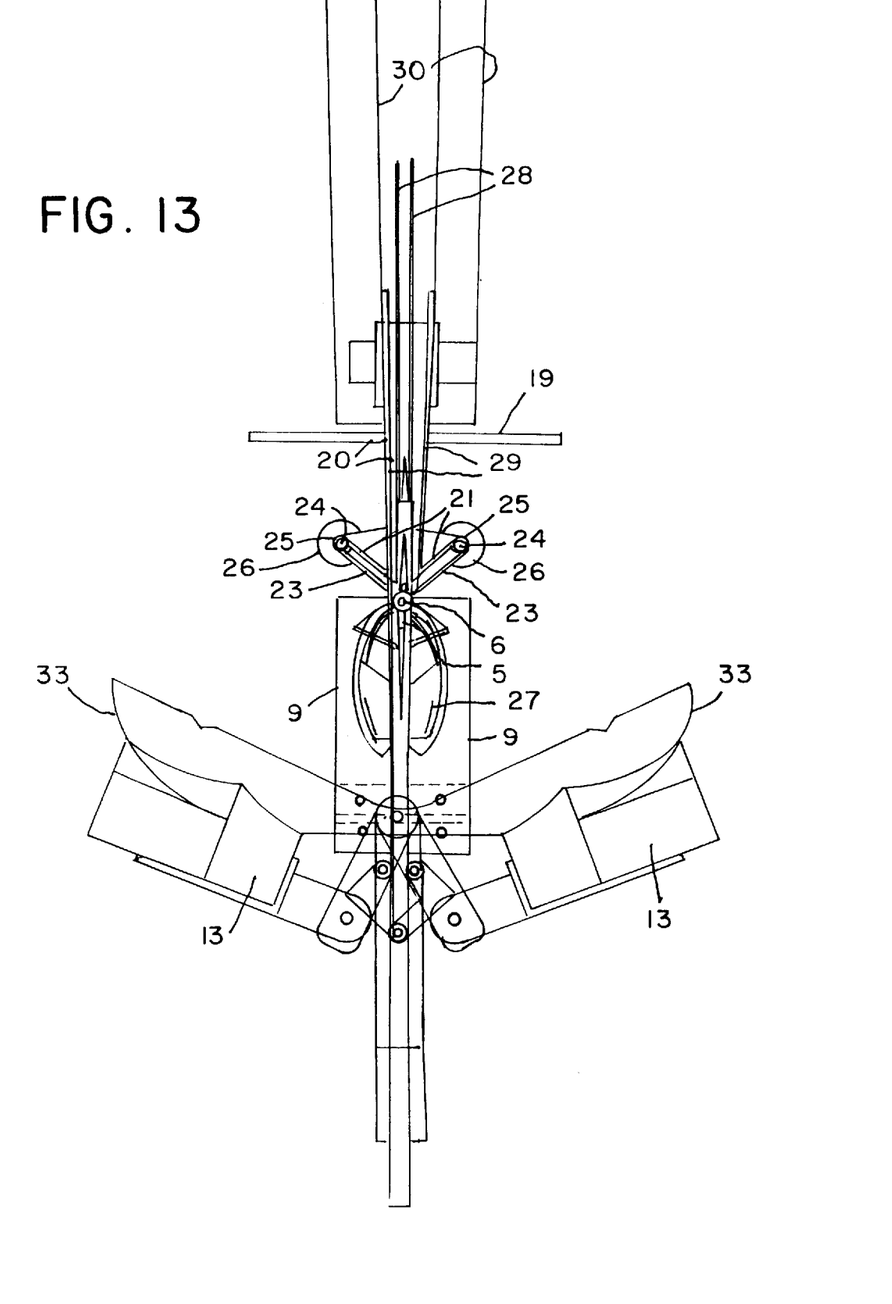
FIG. 13 is an end view of the apparatus of FIG. 12. The drawing shows the vacuum supports fully opened, holding two fillets connected at the belly flap.

When the spine support and the cutter body 20 have reached the extent of their travel, as shown in FIGS. 12 and 13, the vacuum supports 13 carrying the fillets 33 move apart, thereby pulling the fillets away from the pin bone arrays 22, the spine 31 and the rib bones 27. The pin bone arrays 22 remain attached to the spine 31, which rests securely on the spine support 4. The belly flap has not been cut. The spine 31, pin bone array 22, fins and entrails remain on the spine support 4 and are then removed. The fillets are removed or dropped from the vacuum supports 13. The fillets are folded together or separated at the belly flap. The blade assembly, or spine support assembly, is withdrawn, and the system 1 is ready for another operation.

In one preferred embodiment, the blade assembly shown in FIGS. 4–6, or the jig assembly, as shown in FIGS. 1–3, is inserted using a single impact. Other methods, such as basic actuator force, may also be used. The blade assembly or jig is preferably actuated manually, hydraulically, pneumatically, or electrically.

In one preferred embodiment, the present system has dimensions and features for heavy commercial applications. In other preferred embodiments, the system is a light, hand-operated machine for low quantity applications.

While the invention has been described with reference to specific embodiments, modifications and variations of the invention may be constructed without departing from the scope of the invention, which is defined in the following claims.

I claim:

1. An apparatus for removing bones from flesh in a fish body comprising a jig for supporting the fish, a stabilizer connected to the jig for stabilizing the fish on the jig, and a blade assembly movable relative to the jig for separating the bones from the flesh, wherein the blade assembly further comprises a cutter body having pin bone blades positioned on the cutter body for penetrating a length of the fish body for separating flesh from pin bones, dorsal blades supported on the cutter body above the pin bone blades for cutting fish along a dorsal fin and dorsal bones, hinged rib bone blades connected to the cutter body for separating rib bones from surrounding flesh without cutting the rib bones, and actuatable drop blades mounted on the cutter body for movement of the drop blades through the fish.

2. The apparatus of claim 1, wherein the jig further comprises a base, a vertical member extending from the base, and a cantilevered spine support extending in a generally horizontal direction from the vertical member for carrying the fish body.

3. The apparatus of claim 2, wherein the spine support further comprises a longitudinal slot, and further comprises an extension pin provided in the slot of the support for extending beyond the spine support, and wherein the jig further comprises a screw positioned above the spine support for screwing into an end of a fish spine and securing the fish body on the spine support.

4. The apparatus of claim 2, further comprising guides connected to the jig and positioned on the vertical member for receiving the rib bone blades and guiding the rib bone blades.

5. The apparatus of claim 1, wherein the rib bone blades further comprise upper hinged sections and lower hinged sections.

6. The apparatus of claim 5, wherein the upper hinged sections are hingedly connected to the lower pin bone blades.

7. The apparatus of claim 5, wherein the lower hinged sections have diagonal leading edges that toe inward.

8. The apparatus of claim 1, wherein the stabilizer further comprises a vacuum support comprising a first part and a second part hinged to the jig, and wherein the first part and the second part are shaped to receive opposite sides of the fish body.

9. The apparatus of claim 8, wherein the jig further comprises a base, and wherein the first part and the second part are hinged to the base.

10. The apparatus of claim 1, wherein the dorsal blades are circular disc blades.

11. The apparatus of claim 1 further comprising a pelvic bone and fins removal device for separating a pelvic bone and fins from surrounding flesh.

12. An apparatus for removing bones from a fish comprising a base, a support structure extending vertically upwards from the base, a cantilevered spine support extending in a generally horizontal direction from the support structure, a pair of rib blade guides connected to the support structure, a pair of jaw-toothed blades movably attached to the base, a pair of vacuum supports hingedly connected to the base, a blade assembly comprising a horizontal cutter body having leading edges, a pair of upper pin bone blades connected to the cutter body, a pair of lower pin bone blades connected to upper pin bone blades, tubes connected to ends of the lower pin bone blades and the upper pin bone blades, rotary pin bone ligament cutters extending from the tubes, a pair of upper rib blades hingedly connected to the lower pin bone blades, a pair of lower curved rib blades hingedly connected to upper rib blades, a pair of circular dorsal blades mounted on leading edges of the cutter body and a pair of drop blades mounted near the leading edges of the cutter body, and wherein relatively moving the support structure and the blade assembly blades moves the blades and the fish.

13. The apparatus of claim 12, wherein the cantilevered spine support further comprises a longitudinal slot, and further comprises an extension pin provided in the slot of the spine support for extending the extension pin into the fish beyond the spine support, and wherein a spine screw is positioned above or in proximity to the cantilevered spine support, the spine screw having a sharp point which threads into the spine of a fish and holds a backbone of the fish on the spine support.

14. The apparatus of claim 12, wherein the vacuum supports are actuated manually, with hydraulically, pneumatically or electrically, for supporting the fish and lifting fillets away from the bones as the cutter body moves relative to the fish.

15. The apparatus of claim 12, wherein the cutter body is moved relative to the fish manually, hydraulically, pneumatically or electrically.

16. The apparatus of claim 12, wherein the lower curved rib blades have diagonal leading edges that toe inward.

17. A method of filleting and deboning and separating flesh and bones from a decapitated fish comprising securing a decapitated fish to a support jig, actuating supports and fastening the supports to both sides of the fish, actuating a device for cutting away pelvic fins and bone structure, inserting back-cutting blades on both sides of a dorsal fin and an upper vertical bone array through flesh at a removed head end, inserting pin bone blades immediately above and below pin bone arrays, inserting cutters for severing ligaments at outer skin ends of the pin bone arrays while passing the pin bone blades along the length of the pin bone arrays for cutting the flesh away from the pin bones, inserting upper blades above rib bones, inserting lower blades outside of the rib bones and cutting the flesh away from the rib bones, while moving the upper and lower blades through guides for causing the lower blades to follow a diminishing profile of the rib bones, inserting drop blades to the rear of the pin bone arrays and passing the drop blades diagonally next to the backbone until the drop blades protrude through the lower skin near the anal fins opening and then pass out of a tail of the fish, on completion of the blade insertions actuating the supports and moving the supports apart, pulling fillets away from the backbone, pin bone arrays and rib bones, removing the backbone, pin bone arrays, rib bones and fins from the support jig, removing fillets from supports and folding the fillets together or cutting along a belly flap into two fillets, and packaging the fillets.

* * * * *